United States Patent
Grossetete

(10) Patent No.: US 10,847,276 B2
(45) Date of Patent: Nov. 24, 2020

(54) METHOD FOR CONTROLLING A PRESSURIZED WATER NUCLEAR REACTOR DURING STRETCHOUT

(71) Applicant: AREVA NP, Courbevoie (FR)

(72) Inventor: Alain Grossetete, Nanterre (FR)

(73) Assignee: AREVA NP, Courbevoie (FR)

( * ) Notice: Subject to any disclaimer, the term of this patent is extended or adjusted under 35 U.S.C. 154(b) by 295 days.

(21) Appl. No.: 14/902,299

(22) PCT Filed: Jul. 4, 2014

(86) PCT No.: PCT/EP2014/064366
§ 371 (c)(1),
(2) Date: Dec. 30, 2015

(87) PCT Pub. No.: WO2015/001102
PCT Pub. Date: Jan. 8, 2015

(65) Prior Publication Data
US 2016/0372222 A1 Dec. 22, 2016

(30) Foreign Application Priority Data

Jul. 4, 2013 (FR) ..................................... 13 56583

(51) Int. Cl.
*G21D 3/10* (2006.01)
*G21C 7/08* (2006.01)
(Continued)

(52) U.S. Cl.
CPC ............... *G21D 3/10* (2013.01); *G21C 7/08* (2013.01); *G21D 3/001* (2013.01); *G21D 3/08* (2013.01);
(Continued)

(58) Field of Classification Search
CPC . G21C 7/08; G21C 17/10; G21C 7/06; G21C 7/00; G21C 7/005; G21C 7/04;
(Continued)

(56) References Cited

U.S. PATENT DOCUMENTS

| | | | |
|---|---|---|---|
| 4,000,037 A | 12/1976 | Nusbaum et al. | |
| 4,222,822 A * | 9/1980 | Mueller | G21D 3/16 376/217 |

(Continued)

FOREIGN PATENT DOCUMENTS

| | | | | |
|---|---|---|---|---|
| GB | 1341131 | 12/1973 | | |
| WO | WO-2012157836 A1 * | 11/2012 | | G21C 7/08 |

OTHER PUBLICATIONS

Lobo, L. "Coastdown in Light Water Reactors as a Fuel Management Strategy", SM Thesis, MIT Nuclear Engineering Department, Dec. 1980; available at https://inis.iaea.org/collection/NCLCollectionStore/_Public/13/650/13650800.pdf (Year: 1980).*

(Continued)

*Primary Examiner* — Sharon M Davis
(74) *Attorney, Agent, or Firm* — Greer, Burns & Crain, Ltd.

(57) ABSTRACT

A method for controlling a pressurized water nuclear reactor is provided, including core producing thermal power, sensors for acquiring the mean temperature of the primary coolant and for calculating the thermal power, actuators for controlling the axial distribution of power, the control method including:
  a first control phase for controlling the reactor during normal operation by controlling the mean temperature of the primary coolant so as to make it correspond to a reference temperature profile ($P_{ref}$) dependent on the thermal power of the reactor; and
  a second control phase, referred to as stretchout, that occurs after normal operation of the reactor in order to control the reactor in stretchout by controlling the axial distribution of power, the mean temperature varying freely in a temperature range delimited by an upper limit and a lower limit.

6 Claims, 2 Drawing Sheets

(51) Int. Cl.
*G21D 3/00* (2006.01)
*G21D 3/08* (2006.01)
G21C 7/117 (2006.01)
G21C 17/022 (2006.01)

(52) U.S. Cl.
CPC ............ *G21C 7/117* (2013.01); *G21C 17/022* (2013.01); *Y02E 30/30* (2013.01)

(58) Field of Classification Search
CPC ... G21C 7/32; G21D 3/08; G21D 3/10; G21D 3/14; G21D 3/16; G21D 3/18; G21D 3/12
See application file for complete search history.

(56) References Cited

U.S. PATENT DOCUMENTS

| | | | | |
|---|---|---|---|---|
| 4,240,874 A | * | 12/1980 | Millot | G21C 7/06 376/237 |
| 4,470,949 A | * | 9/1984 | Deroubaix | G21C 7/00 376/217 |
| 4,582,669 A | | 4/1986 | Watts et al. | |
| 5,158,738 A | * | 10/1992 | Trouble | G21C 7/36 376/217 |
| 2008/0069288 A1 | * | 3/2008 | Grossetete | G21C 7/00 376/217 |
| 2013/0101077 A1 | * | 4/2013 | Drudy | G21C 7/08 376/237 |

OTHER PUBLICATIONS

Bohm, W. et al. "Load Following Behaviour and Cycle Duration Flexibility of Light Water Reactor Power Stations" Fourth United Nations International Conference on the Peaceful Uses of Atomic Energy, AED-CONF-71-100-04; Sep. 1971; available at https://www.osti.gov/servlets/purl/4669166 (Year: 1971).*
Vincke et al, "AVN's axperience as TSO in safety assessments of steam-generator-replacement and power-uprate projects" AVN (Association Vincotte Nuclear), Nov. 8, 2005, p. 1-10.
Search Report and Written Opinion of FR 1356583, dated Mar. 7, 2014.

* cited by examiner

METHOD FOR CONTROLLING A PRESSURIZED WATER NUCLEAR REACTOR DURING STRETCHOUT

BACKGROUND

The field of the invention is that of the control of a pressurized water nuclear reactor when said reactor reaches end of cycle (during stretchout).

A pressurized water nuclear reactor is considered at end of cycle when in nominal condition (thermal power equal to 100% of the nominal power) the boron concentration is close to zero, typically less than 10 ppm (parts per million).

Nevertheless, at end of cycle, it is all the same possible to differ refuelling and to continue the power operation of the reactor by compensating the loss of reactivity due to the depletion of the fuel by a drop in the primary temperature, providing the necessary reactivity by "moderator effect" (variation in the reactivity provided by the variation in temperature of the moderator, water). This cycle prolongation phase is usually known as "stretchout".

During this "stretchout" phase, the control of the reactor via conventional control means (control of the mean temperature of the primary coolant and control of the axial distribution of power) is made difficult by the absence of the possibility of modifying by dilution the boron concentration in the primary coolant. This difficulty of control is amplified by the fact that the fuel depleted core is more unstable in view of axial xenon oscillations. Thus, during this stretchout phase, control rod cluster movements are to be avoided.

Throughout this "stretchout" phase, which may last up to two months, the drop in reactivity is compensated by the drop in temperature of the primary coolant. This drop in temperature leads to a drop in pressure at the level of the steam generators. Thus, the maximum power of the reactor is going to be limited by the power which can be reached by the turbine (all turbine inlet valves open) given the steam pressure upstream of the turbine inlet valves.

Furthermore, during this stretchout phase, the manoeuvrability of the reactor is greatly reduced. It is not in fact possible to regulate the power produced by the reactor so as to correspond to a programme pre-established by the electricity grid operating service (load monitoring), or to carry out, or then very occasionally and under increased surveillance, adjustments in real time of the production of power compared to electrical energy consumption with variations of small amplitudes (frequency adjustment).

During this stretchout, it is also necessary for the operator to carry out increased surveillance to detect xenon oscillation starts as soon as possible. In the case of xenon oscillation, a drop in load may be necessary in order to control the reactor, which makes any power rise difficult or even impossible. In fact, after a drop in load, xenon growth can no longer be compensated by dilution operations, which necessitates an extraction of the control rod clusters. When the control rod clusters are positioned at the top of the core (extracted position), the control of the axial distribution of power is no longer possible and the reactor must be stopped.

FIG. 1 illustrates the different temperature programmes in the course of the "stretchout" phase. The first profile $P_{ref}$ conventionally represents an example of reference temperature profile as a function of power of a programme for regulating a pressurized water reactor when it is in normal operation. During "stretchout", the temperature profile of the temperature regulation programme is shifted periodically (of the order of several days) by several degrees, typically 2 to 3° C. The reference temperature profile $P_{ref}$ during normal operation is thus conserved during the "stretchout" phase and is broken down into different profiles $P_1, P_2, P_3, \ldots P_n$ over time.

With this type of control in "stretchout", the regulation of the temperature in normal mode is thus conserved with the new temperature profiles (with potentially an increase in the dead band to limit control rod cluster actions).

SUMMARY

The control method according to the invention makes it possible to modify the principle of regulation of the mean temperature of the primary coolant and the axial distribution of power conventionally used during this "stretchout" phase.

In this context the invention aims to provide a method for controlling during stretchout a pressurized water nuclear reactor making it possible to improve the manoeuvrability of the reactor during this stretchout phase of the operation of the reactor and especially making it possible to facilitate the feasibility of frequency adjustment.

To this end, the subject matter of the invention is a method for controlling a pressurized water nuclear reactor comprising:

a core producing thermal power;
sensors for acquiring the mean temperature of the primary coolant and the thermal power;
actuators for controlling the temperature of the primary coolant;
actuators for controlling the axial distribution of power;
the control method comprising a first control phase for controlling the reactor during normal operation by controlling the mean temperature of the primary coolant so as to make it correspond to a reference temperature profile dependent on the thermal power of the reactor;
the method being characterized in that it comprises a second control phase, referred to as stretchout, that occurs after normal operation of the reactor in order to control the reactor in stretchout by controlling the axial distribution of power, the mean temperature varying freely in a temperature range delimited by an upper limit and a lower limit.

It is considered that the reactor is in stretchout from the moment that the boron concentration is equal or less than 50 ppm and preferentially less than 10 ppm.

Thus, the control method in "stretchout" phase according to the invention proposes controlling the axial distribution of power by actions of movements of control rod clusters and letting the mean temperature of the coolant evolve freely without following a temperature profile.

This principle of regulation in stretchout phase is especially facilitated because the mean temperature of the primary coolant during this phase does not vary much given the high moderator effect.

Thanks to the control method according to the invention, the frequency adjustment of the reactor during stretchout phase is largely facilitated compared to the control according to the prior art, because the mean temperature can vary freely and no longer has to be regulated to correspond to a reference temperature profile, as illustrated as an example in FIG. 1.

Furthermore, the particular principle of regulation of the control method in stretchout phase according to the invention makes it possible to exploit the reactor at the maximum possible power, in particular after the realisation of a drop in load, which was not the case with control according to the prior art. In fact, after a drop in load (reduction in the power of the reactor), it is possible to exploit the drop in temperature to compensate xenon growth and to make the reactor operate at its maximum power. An example will be described hereafter in the description.

The method for controlling a pressurized water nuclear reactor according to the invention may also have one or more of the characteristics below taken individually or according to any technically possible combinations thereof:

in stretchout phase, the control of the axial distribution of power is brought about by movements of control rod clusters in the core;

in stretchout phase, the control of the axial distribution is brought about by movements of a group of rod clusters situated above mid-height of the core such that the lower ends of the rod clusters move between the upper part and the mid-height of the core;

during normal operating phase, the control of the mean temperature of the primary coolant and the axial distribution of power are brought about by movements of rod clusters in the core with or without modification of the boron concentration of the primary coolant;

in stretchout phase, the control of the axial distribution of power is automated;

in stretchout phase, the control of the axial distribution of power is carried out to within a dead band around the set point axial distribution of power;

the upper limit of the temperature range corresponds to the reference temperature profile during normal operation of the reactor;

the lower limit of the temperature range corresponds to the reference temperature profile during normal operation of the reactor with a shift of $-Y°$ C., Y being comprised between 5 and 50, and preferentially between 5 and 30;

in a variant, the lower limit corresponds to a fixed temperature equal to the reference temperature at 100% of nominal power with a shift of $-Z°$ C., Z being comprised between 10 and 50, and preferentially between 20 and 30;

in stretchout phase, the temperature range in which the mean temperature of the primary coolant can vary freely is limited by the maximum power which may be supplied to the turbine dependent on the temperature of the primary coolant, called turbine limit.

BRIEF DESCRIPTION OF THE DRAWINGS

Other characteristics and advantages of the invention will become clearer from the description that is given thereof below, for indicative purposes and in no way limiting, with reference to the figures.

DETAILED DESCRIPTION

Figure 1:
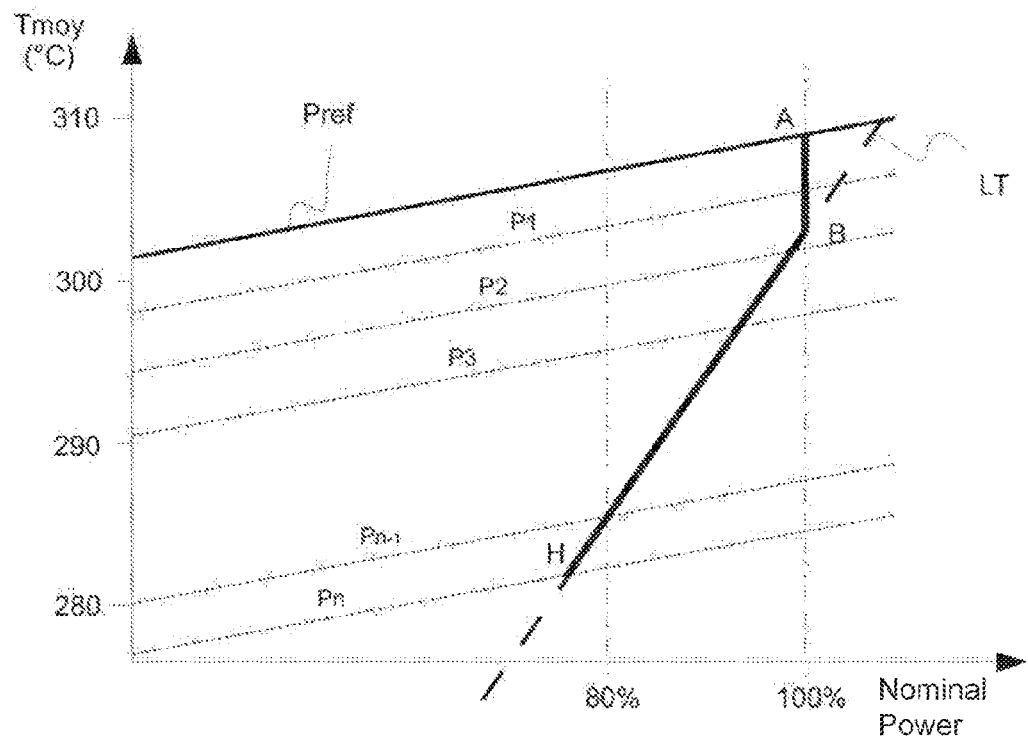
FIG. 1, described previously, illustrates the different temperature regulation programmes in the course of stretchout phase as well as the evolution of temperature as a function of power in the course of this phase during operation at maximum power according to the prior art.

As described previously in FIG. 1, when the reactor goes into "stretchout" after a cycle of normal operation, a first phase consists in conserving as much as possible the thermal power of the reactor at 100% of nominal power (PN). This first phase is illustrated in FIG. 1 between points A and B. The maintaining at 100% of nominal power is achieved by increasing the opening of the turbine inlet valves as the pressure of the secondary circuit (and the mean temperature) drops. The end of this first phase corresponds to reaching the full opening of the turbine inlet valves (point B).

The turbine inlet valves being completely open, the power can no longer be maintained at 100% when the steam pressure drops. The maximum thermal power of the reactor thus drops as the mean temperature of the primary coolant drops and thus as the steam pressure drops. This phase is represented in FIG. 1 between points B and H. It occurs after the first phase described previously and corresponds to the evolution of the power of the reactor at full power limited by the steam pressure at the turbine. This limit is designated hereafter "turbine limit" and is represented by the dotted line referenced LT in FIG. 1.

According to the prior art, in the course of this A-B then B-H phase described previously, the temperature programme is shifted by a programme $P_i$ to $P_{i+1}$ as the temperature drops when the temperature reaches the lower limit of the dead band of the temperature programme $P_i$.

According to the method of the invention, the evolution of the temperature of the reactor at maximum power is also limited by the steam pressure at the turbine. On the other hand, the temperature evolves freely and is no longer regulated according to a temperature regulation programme $P_i$. Nevertheless, when maximum power is maintained in the course of "stretchout", the evolution of temperature as a function of power remains identical to the evolution described previously according to the prior art.

Figure 2:
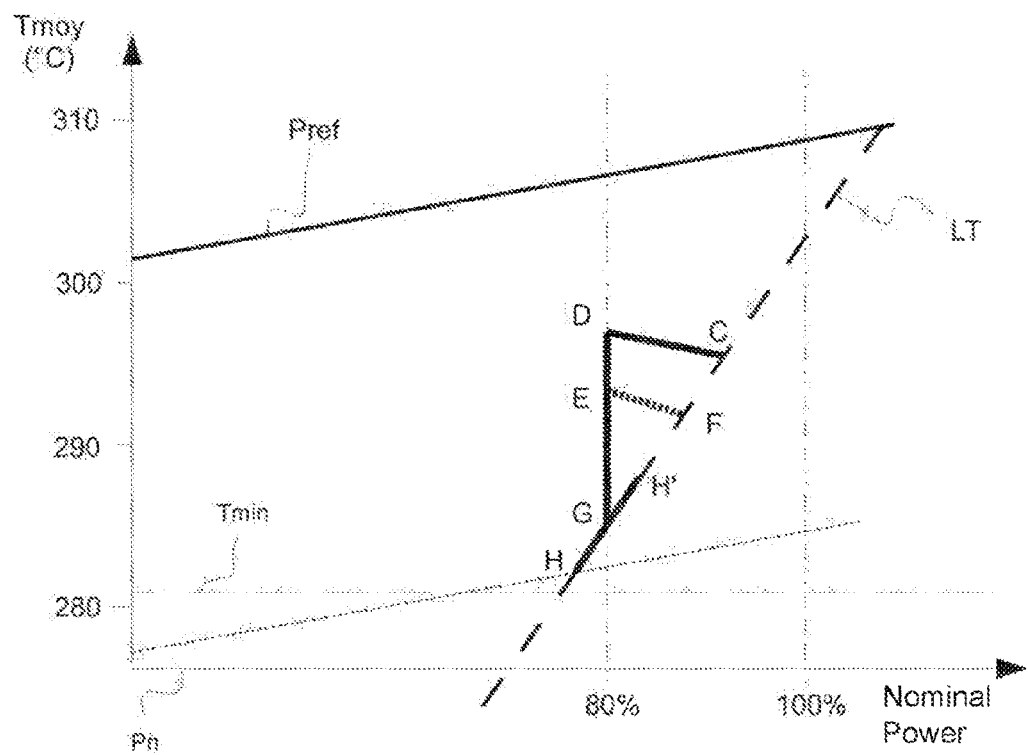
FIG. 2 illustrates an example of evolution of temperature as a function of power during a drop in load that occurs in the course of the stretchout phase according to the invention.
Figure 3:
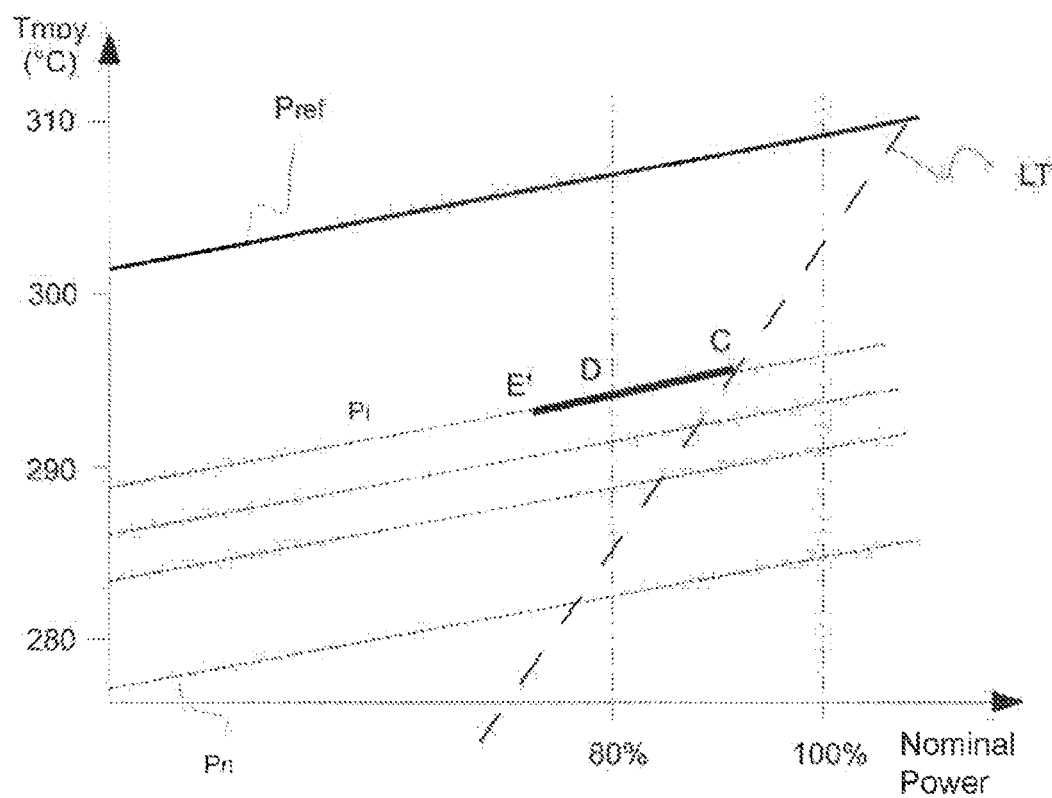
FIG. 3 illustrates the evolution of temperature as a function of power during a drop in load that occurs in the course of the stretchout phase according to the prior art.

FIGS. 2 and 3 illustrate the gain provided in "stretchout" by the control method according to the invention, particularly during a drop in load.

More particularly, FIG. 2 illustrates an example of evolution of temperature as a function of power according to the invention during a drop in load that occurs in the course of the stretchout phase described previously.

As a comparison, FIG. 3 illustrates the evolution of temperature as a function of power during a drop in load that occurs in the course of the stretchout phase according to the control method of the prior art.

With reference to FIG. 2, during the realisation of a drop in load, for example with a low stage at 80% of nominal power, from point C with the control method of the invention controlling exclusively the axial distribution of power by insertion of the control rod clusters, the mean temperature of the primary coolant is typically going to increase a little given the cumulative effects of the insertion of the rod clusters for controlling the axial distribution of power and the compensation of the other effects of reactivity by the mean temperature. This drop in load is rapid (several minutes) and is represented in FIG. 2 between points C and D. At the low stage of the drop in load (80% of nominal power), xenon growth is offset by the possible drop in the mean temperature without modification of the nominal power (point D to G). Thus, following this drop in load, the reactor can continue to operate at the low stage as long as the mean temperature has not reached the turbine limit LT (point G). Once the temperature reaches the turbine limit, dependent on the xenon concentration in the primary coolant, the mean temperature can drop (when the xenon concentration is high) consequently leading to a drop in the thermal power of the reactor (point G to H) or may also increase (when the xenon concentration is low) making it possible to achieve a rise in power to reach the maximum power possible for example by following the turbine limit LT (point G to H', or even C).

Throughout the phase, the axial distribution of power is continued to be controlled by movements of the control rod clusters.

Thus, following a drop in load, as described previously, the control method according to the invention enables the reactor to be made to operate longer at its maximum power.

Moreover, the control method according to the invention also enables a rise in power following a drop in load, as represented by the dotted line between points E and F, as long as the turbine limit is not reached. In an identical manner, when the temperature reaches the turbine limit, the variation in temperature (increase or decrease) will depend on the xenon concentration at the moment the turbine limit (point F) is reached.

It is also possible to define the upper and lower limits of evolution of the mean temperature of the primary coolant. The upper limit may for example be the reference temperature regulation profile as a function of the power of the reactor during normal operation $P_{ref}$. The lower limit may for example be the temperature regulation profile as a function of the power of the reactor shifted by $-Y°$ C., with Y comprised between 5 and 50, and preferentially between 5 and 30, and corresponding to the temperature profile $P_n$ at the end of the stretchout phase. As an example, the duration of the stretchout phase is generally 30 days and may last up to 60 days.

In a variant, the lower limit, referenced $T_{min}$ in FIG. 2, corresponds to a fixed temperature equal to the reference temperature at 100% of nominal power with a shift of $-Z°$ C., Z being comprised between 10 and 50, and preferentially between 20 and 30.

The temperature range thereby limited by the upper and lower limits is practically contained in the range which has been the subject of a safety study in "stretchout" phase according to the method of the prior art.

In situations where the mean temperature of the primary coolant reaches the upper limit or the lower limit of the temperature range in which the temperature can vary freely, it is possible to intervene by acting as a priority on the rod clusters if that is possible, then on the power and finally on the boron concentration if it is not possible to act on the power.

It is possible to use as actuators for controlling the temperature of the primary coolant both the control rod clusters and the boron injection system. The same is true for the actuators for controlling the axial distribution of power.

The sensors for acquiring the mean temperature of the primary coolant are for example sensors for measuring the temperature of the primary coolant situated in the hot branch and in the cold branch of the primary circuit (the mean temperature then being calculated by determining the mean of the hot branch and cold branch temperatures).

The thermal power may for example be calculated using the difference in temperatures measured by the sensors situated in the hot branch and in the cold branch of the primary circuit.

Thus, as an example, when the mean temperature reaches the upper limit of the temperature range, the first action consists in inserting the rod clusters if that is possible. Nevertheless, if the axial distribution of power is heading too much towards the bottom of the core (that is to say that there is a greater flux in the bottom of the core than in the top), an insertion of the control rod clusters will not be possible because that would even further unbalance the axial distribution of power, then it is possible to increase the power if it is not already at its maximum power and potentially extract at the same time the control rod clusters.

If it is not possible to increase the power because it is already at its maximum limit, then a boration action may be carried out.

If the temperature reaches the lower limit, for example from point H in FIG. 2, as a priority the control rod clusters are extracted if the rod clusters are not at the upper limit in the core and if the axial distribution of power is not heading too much towards the top of the core. If an extraction of the control rod clusters is not possible, then the power is reduced and the rod clusters are inserted if necessary.

Using the principle of regulation according to the prior art, the regulation of the mean temperature of the reactor would have imposed regulating the drop in temperature following the drop in load following the reference temperature profile and thus to reduce the thermal power of the reactor. For comparison, the behaviour of the reactor according to the same conditions but controlled according to the principle of control of the prior art is represented in FIG. 3.

When a drop in load is realised from point C identical to that described previously with reference to FIG. 2, the control method according to the prior art is going to impose regulating the temperature so that the mean temperature of the primary coolant corresponds to a temperature profile Pi. This drop in load is represented in FIG. 3 between points C and D. Following this drop in load, the drop in the mean temperature is going to continue to be regulated according to a same temperature profile (points D to E') implying a drop in power of the reactor taking account of the necessity of controlling the temperature without perturbing too much the axial distribution of power. This in practice can cause the operator to stop the reactor shortly after this drop in load.

Furthermore, according to the prior art, it is not possible to operate at constant power up to the turbine limit following a drop in load.

The control method in stretchout phase is applicable whatever the control mode of the reactor. Thus, if the reactor has several types of control rod clusters with different neutron absorptivities, the regulation of the axial distribution of power in stretchout phase is identical but with an additional freedom of adjustment which makes it possible to further optimise the control of the reactor during this stretchout phase.

The control method according to the invention has been particularly described with a linear temperature regulation programme, nevertheless, the invention is also applicable whatever the profile of the temperature regulation programme.

The invention claimed is:

1. A method for controlling a pressurized water nuclear reactor comprising:
   a core producing thermal power;
   control rod clusters and a boron injection system configured to control the mean temperature of the primary coolant from the core and an axial distribution of power;
   the control method comprising:
   a first control phase comprising a step of controlling the reactor during normal operation by moving the control rod clusters in the core so as to make the mean temperature of the primary coolant correspond to a reference temperature profile (Pref) dependent on the thermal power of the reactor; and
   a second control phase, referred to as a stretchout phase, that occurs after normal operation of the reactor, when the fuel of the core is used up such that a concentration of boron in the primary coolant is below 50 ppm when the thermal power of the nuclear reactor is 100% of nominal power, said second control phase comprising a step of controlling the reactor by movements of the control rod clusters, wherein the mean temperature of the primary coolant evolves freely in a temperature range having an upper limit and a lower limit, wherein the upper limit of the temperature range corresponds to the reference temperature profile (Pref) during normal operation of the reactor, and wherein the lower limit of the temperature range corresponds to the reference temperature profile (Pref) during normal operation of the reactor with a shift of $-Y°$ C., Y being between 5 and 50, or the lower limit corresponds to a fixed temperature equal to a reference temperature at 100% of nominal power with a shift of $-Z°$ C., Z being between 10 and 50.

2. The method for controlling a pressurized water nuclear reactor according to claim 1, wherein in the stretchout phase, the control of axial distribution is brought about by moving the control rod clusters situated above a mid-height of the core such that lower ends of the control rod clusters move between an upper part and the mid-height of the core.

3. The method for controlling a pressurized water nuclear reactor according to claim 1, wherein in stretchout phase the control of the axial distribution of power is automated.

4. The method for controlling a pressurized water nuclear reactor according to claim 1, wherein Y is between 5 and 30.

5. The method for controlling a pressurized water nuclear reactor according to claim 1, wherein Z is between 20 and 30.

6. The method for controlling a pressurized water nuclear reactor according to claim 1, wherein the second control phase further comprises:
- a first sub-phase during which the thermal power of the reactor is kept at 100% of nominal power by increasing an opening of turbine inlet valves; and
- a second sub-phase during which the turbine inlet valves are fully opened and the thermal power of the reactor decreases.

\* \* \* \* \*